US007844745B1

United States Patent
Darbyshire et al.

(10) Patent No.: US 7,844,745 B1
(45) Date of Patent: Nov. 30, 2010

(54) ALTERNATE HOME SUBSCRIBER SERVER (HSS) NODE TO RECEIVE A REQUEST IF A FIRST HSS NODE CANNOT HANDLE SAID REQUEST

(75) Inventors: Alan Darbyshire, Oxford (GB); Matteo Candaten, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 575 days.

(21) Appl. No.: 10/922,255

(22) Filed: Aug. 19, 2004

(51) Int. Cl.
*G06F 3/00* (2006.01)

(52) U.S. Cl. .......................... 710/3; 709/225; 709/245; 455/435; 726/3

(58) Field of Classification Search ............. 455/435.1, 455/445, 456.2, 435; 710/3; 726/3
See application file for complete search history.

(56) References Cited

U.S. PATENT DOCUMENTS

| | | | | |
|---|---|---|---|---|
| 5,623,532 | A * | 4/1997 | Houde et al. | 455/445 |
| 6,101,380 | A * | 8/2000 | Sollee | 455/411 |
| 6,314,291 | B1 * | 11/2001 | Fujimichi | 455/433 |
| 6,678,769 | B1 * | 1/2004 | Hatae et al. | 710/105 |
| 6,751,191 | B1 * | 6/2004 | Kanekar et al. | 370/217 |
| 6,850,518 | B1 * | 2/2005 | Khanna | 370/389 |
| 7,013,139 | B1 * | 3/2006 | Gan et al. | 455/432.3 |
| 7,028,311 | B2 * | 4/2006 | Roach et al. | 719/328 |
| 7,082,308 | B1 * | 7/2006 | Kaura et al. | 455/445 |
| 7,475,140 | B2 * | 1/2009 | Requena | 709/225 |
| 2002/0127995 | A1 * | 9/2002 | Faccinn et al. | 455/406 |
| 2002/0147845 | A1 * | 10/2002 | Sanchez-Herrero et al. | 709/245 |
| 2003/0233457 | A1 * | 12/2003 | Basilier et al. | 709/227 |
| 2004/0193725 | A1 * | 9/2004 | Costa-Requena et al. | 709/238 |
| 2004/0199649 | A1 * | 10/2004 | Tarnanen et al. | 709/230 |
| 2004/0203763 | A1 * | 10/2004 | Tammi | 455/435.1 |
| 2005/0004968 | A1 * | 1/2005 | Mononen et al. | 709/200 |
| 2005/0108437 | A1 * | 5/2005 | Loughney | 709/249 |

OTHER PUBLICATIONS

Kim et al., "A Design of Home Subscriber Server for IP Multimedia Service in All-IP UMTS Network", 2003, pp. 2073-2077.*

* cited by examiner

*Primary Examiner*—Alford W Kindred
*Assistant Examiner*—Ernest Unelus
(74) *Attorney, Agent, or Firm*—Trop Pruner & Hu, P.C.

(57) ABSTRACT

This invention relates to methods and apparatus for providing a resilient network database. The invention relates particularly, but not exclusively, to the IP Multimedia Subsystem (IMS). The invention is directed to an interface for a database node comprising: a port for receiving a request for information from a network node; a processor for determining if the database node can respond to said request; and a transmitter for forwarding the request to another database node if the particular database node cannot respond. The invention is also directed to a distributed database comprising a number of database nodes, wherein a request received by one node is forwarded to other nodes in the distributed database if the particular node cannot handle the request.

34 Claims, 10 Drawing Sheets

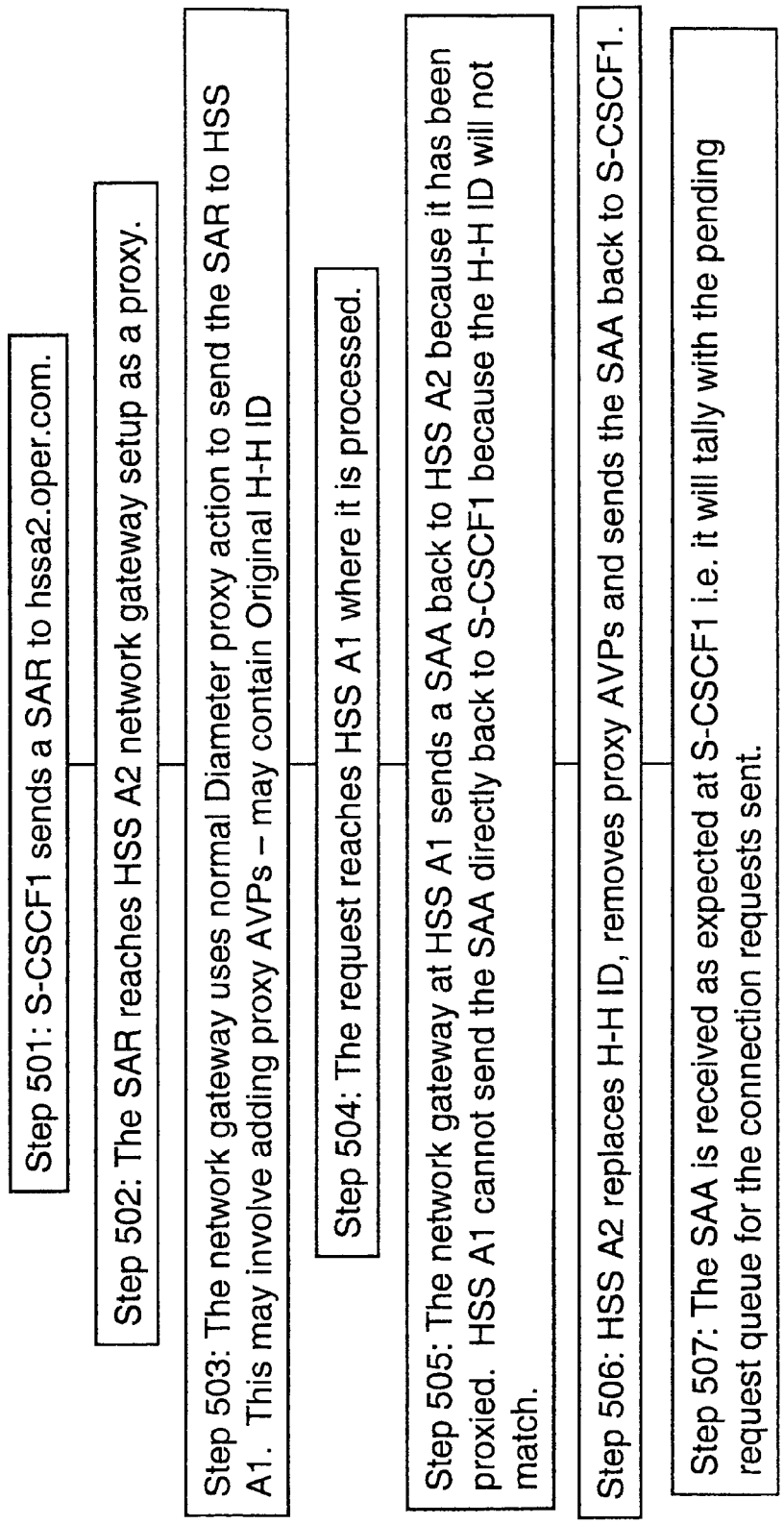

Fig. 6

Step 501: S-CSCF1 sends a SAR to hssa2.oper.com.

Step 502: The SAR reaches HSS A2 network gateway setup as a proxy.

Step 503: The network gateway uses normal Diameter proxy action to send the SAR to HSS A1. This may involve adding proxy AVPs – may contain Original H-H ID Step 504: The request reaches HSS A1 where it is processed.

Step 505: The network gateway at HSS A1 sends a SAA back to HSS A2 because it has been proxied. HSS A1 cannot send the SAA directly back to S-CSCF1 because the H-H ID will not match.

Step 506: HSS A2 replaces H-H ID, removes proxy AVPs and sends the SAA back to S-CSCF1.

Step 507: The SAA is received as expected at S-CSCF1 i.e. it will tally with the pending request queue for the connection requests sent.

ALTERNATE HOME SUBSCRIBER SERVER (HSS) NODE TO RECEIVE A REQUEST IF A FIRST HSS NODE CANNOT HANDLE SAID REQUEST

FIELD OF THE INVENTION

This invention relates to methods and apparatus for providing a resilient network database. The invention relates particularly, but not exclusively, to the Internet Protocol (IP) Multimedia Subsystem (IMS).

BACKGROUND TO THE INVENTION

The IP Multimedia Subsystem (IMS) is a sub-network created by the 3GPP wireless standards body. IMS is intended as a fully multi-vendor interoperable system which can support delivery of multimedia services to wireless users on a very large scale. Although initially developed for delivery of services to wireless networks, however, it is intended that IMS will also be capable of delivering the multimedia services in an access independent manner i.e. independent of the technology (cellular wireless, WLAN, wireline or other access technology) used by the user to access network services.

FIG. 1 shows a schematic diagram of the IMS network 100 as proposed in 3GPP R5. The diagram shows only a selection of the possible network elements: the Home Subscriber Server (HSS) 101, an Application Server (AS) 102, a Serving Call Session Control Function (S-CSCF) 103, an Interrogating Call Session Control Function (I-CSCF) 104 and a Service Location Function (SLF) 105. The elements are connected by an IP network 106.

An important component of the IMS is the Home Subscriber Server (HSS) 101 which is a database for the network which holds variables and identities for the support, establishment and maintenance of calls and sessions made by subscribers. This includes the subscriber's International Mobile Subscriber Identity (IMSI), security variables and location information. In addition to storing this information on users (also referred to as subscriber profiles) the HSS maintains current subscriber status information, provides service filter criterion, ensures the authenticity of the subscriber and facilitates access independence (e.g. WLAN, wireline).

The S-CSCF 103 provides the session control services for a user and performs functions such as the management of mobile registrations, maintaining of the session, interaction with other services, charging and security. The I-CSCF 104 allows subscribers of the network operator, or roaming subscribers to register.

The network may contain more than one HSS (as shown in FIG. 1) and these may be provided by different vendors. In the situation where there are more than one HSS in the network, the SLF 105 can be used by the CSCF and AS nodes to determine which HSS holds the subscriber profile for a particular user.

Given the important role of the HSS and the large amounts of information that it may need to store, it is vital to provide a robust and scalable HSS solution.

OBJECT TO THE INVENTION

The invention seeks to provide a network database which mitigates at least one of the problems of known methods.

SUMMARY OF THE INVENTION

In summary, the invention is directed to an interface for a database node comprising: a port for receiving a request for information from a network node; a processor for determining if the database node can respond to said request; and a transmitter for forwarding the request to another database node if the particular database node cannot respond. The invention is also directed to a distributed database comprising a number of database nodes, wherein a request received by one node is forwarded to other nodes in the distributed database if the particular node cannot handle the request.

According to a first aspect of the invention there is provided an interface for a first database node comprising: a port for receiving a request for information from a network node; a processor for determining if said first database node can respond to said request; and a transmitter for forwarding the request to a second database node if said first database node cannot respond.

Said processor may also be for obtaining said information from said first database node if said first database node can respond to said request; said port may also be for receiving said information from said second database node if said first database node cannot respond to said request; and said transmitter may also be for sending said information to said network node.

Advantageously, this provides a network database which is scalable and reduces the chances of a single point of failure.

Additionally, the client nodes within the network do not need to know about the intra database structure (the cluster) and they do not need to alter their behaviour. This enables a solution which can inter-work with equipment from other vendors.

The port may be connected to an IP network.

Advantageously, this allows use of an existing network to connect database nodes.

The request may be a Server Assignment Request. The information may be sent to the network node in the form of a Server Assignment Answer.

The transmitter may forward the request using a Diameter application.

The transmitter may also be for sending status information to said second database node.

The status information may relate to one of said interface and said first database node.

The status information may include one of current status information and future status information.

Advantageously, this allows the interface to use the status information to determine where to forward requests.

The transmitter may also be for sending routing information to said second database node.

The transmitter may also be for sharing said status information with remote network nodes.

Advantageously, this allows the remote network nodes to optimise the way they connect with the database nodes.

According to a second aspect of the invention there is provided a database node comprising an interface and a database core, said interface comprising: a port for receiving a request for information from a network node; a processor for determining if said database core can respond to said request; and a transmitter for forwarding the request to a second database node if said first database node cannot respond.

According to a third aspect of the invention there is provided a distributed database comprising a plurality of database nodes, each one of said plurality of database nodes comprising an interface and a database core, said interface comprising: a port for receiving a request for information from a network node; a processor for determining if said database core within said database node can respond to said request; and a transmitter for forwarding the request to another one of said plurality of database nodes if said database node cannot respond.

Said plurality of database nodes may be geographically dispersed.

Advantageously, this provides a robust distributed database.

Each of said plurality of database nodes may be connected to an Internet Protocol Network.

Said distributed database may be a Home Subscriber Server.

Said IP Network may comprise a home realm of a single network operator.

According to a fourth aspect of the invention there is provided a method of operating an interface for a first database node comprising the steps of: receiving a request for information from a network node; determining if said first database node can respond to said request; and forwarding the request to a second database node if said first database node cannot respond.

The method may further comprise the steps of: if said first database node can respond to said request, obtaining said information from said first database node; if said first database node cannot respond to said request, receiving said information from said second database node; and sending said information to said network node.

The method may further comprise the step of: sending status information to said second database node.

The method may further comprise the step of: sending routing information to said second database node.

The method may further comprise the step of: receiving one of status and routing information from other database nodes.

The method may further comprise the step of: sending status information to other nodes in the network.

According to a fifth aspect of the invention there is provided a method of operating a database node comprising the steps of: receiving at an interface, a request for information from a network node; determining if said database node can respond to said request; and forwarding the request to another database node if said database node cannot respond.

According to a sixth aspect of the invention there is provided a method of operating a distributed database, said distributed database comprising a plurality of database nodes, comprising the steps of: receiving at a first one of said plurality of database nodes, a request for information from a network node; determining at said first one of said plurality of database nodes, if said first one can respond to said request; and if said first one cannot respond to said request, forwarding said request from said first one of said plurality of database nodes to a second one of said plurality of database nodes.

The method may further comprise the steps of: if said first one cannot respond to said request, receiving said information from said second one of said plurality of database nodes; and sending said information to said network node in response to said request.

The method may further comprise the steps of: sharing status information between each of said plurality of database nodes; and at said first one, selecting said second one of said plurality of database nodes on the basis of said status information.

The method may further comprise the steps of: sharing routing information between each of said plurality of database nodes; and at said first one, selecting said second one of said plurality of database nodes on the basis of both said status and said routing information.

According to a sixth aspect of the invention there is provided an application for sharing information between a plurality of database nodes, said plurality of database nodes forming a distributed database, the application comprising: means for forwarding requests for information between each of said plurality of database nodes; means for sending said information between each of said plurality of database nodes; and means for sharing status information between each of said plurality of database nodes.

The application may further comprise: means for sharing said status information with a network node, wherein said network node does not form part of said distributed database.

Advantageously, this enables network nodes to optimise their connections to the distributed database. In order to receive this information, the network node may need to have registered with the distributed database.

According to further aspects of the invention there are provided computer programs arranged to perform the methods described.

The methods above may be performed by software in machine readable form on a storage medium.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will now be described with reference to the accompanying drawings in which:

FIG. 6 shows a flow diagram of messages in the network of FIG. 5;

Figure 1:
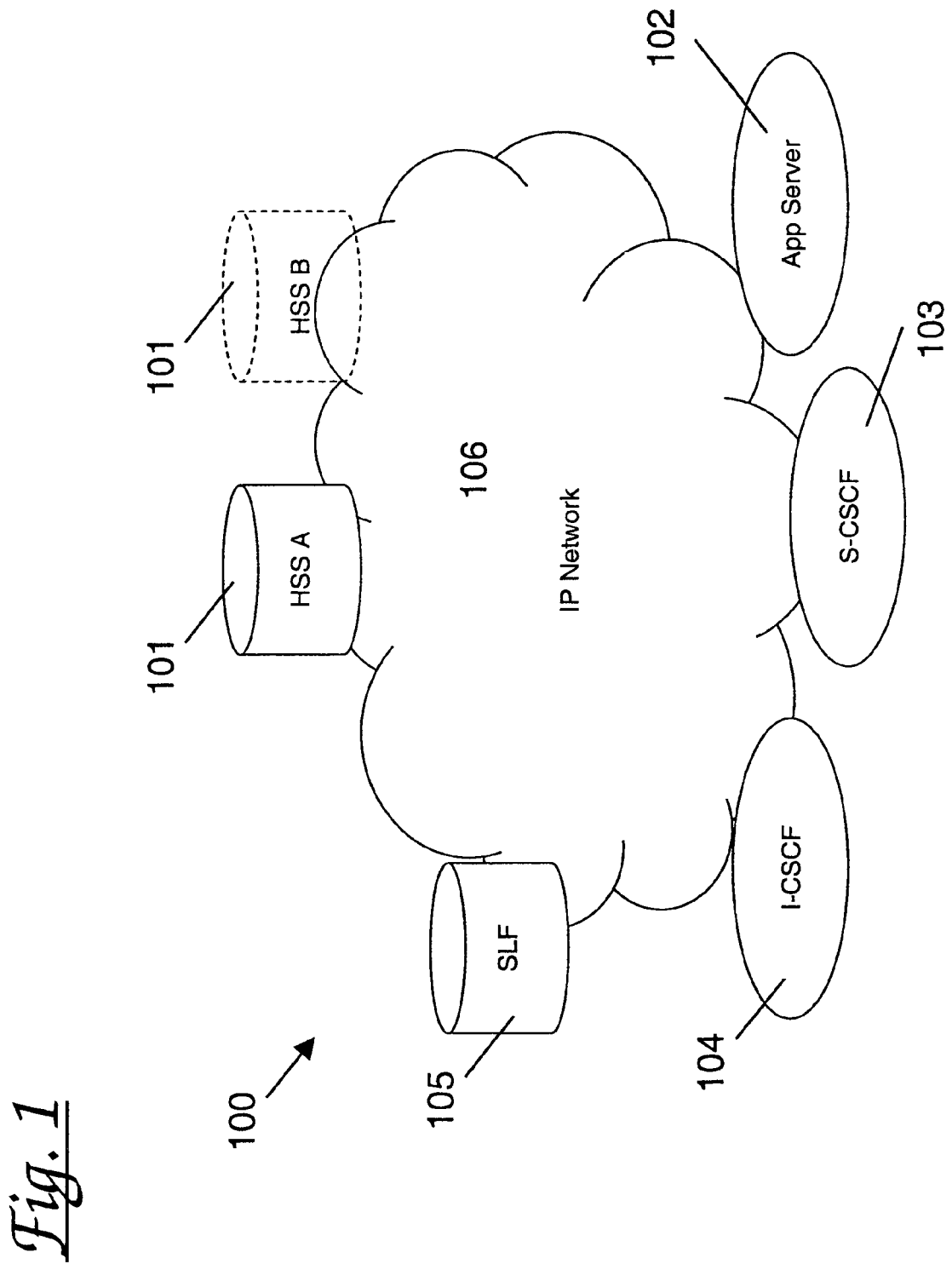
FIG. 1 is a schematic diagram of the IMS network as proposed in 3GPP R5.

Common reference numerals are used throughout the figures where appropriate.

DETAILED DESCRIPTION OF INVENTION

Embodiments of the present invention are described below by way of example only. These examples represent the best ways of putting the invention into practice that are currently known to the Applicant although they are not the only ways in which this could be achieved.

FIG. 1 shows a prior art IMS network which contains two Home Subscriber Servers (HSS) 101. As each subscriber is associated with a particular HSS, client nodes in the network (e.g. CSCF and AS nodes) need to know which subscriber is associated with which HSS in order that it can retrieve the required subscriber information when required. In the network of FIG. 1, this is addressed by inclusion of a Service Location Function (SLF) which the client nodes contact to retrieve the correct HSS address for a given subscriber. However, it can be seen that the SLF solution of FIG. 1 can be problematic. Firstly, as the number of subscribers grows, the SLF will need to handle increasing numbers of requests for HSS addresses and will also need capacity to store increasing amounts of information. Thus this solution is not scalable. Secondly, if the SLF fails, or needs to be taken out of operation for maintenance or upgrade, the network cannot operate. By definition there can be only one SLF in the network. Thirdly, the information maintained in the SLF needs to be updated dynamically to reflect changes in the internal distribution of subscribers across the operator's HSS nodes. The 3GPP R5 standards do not provide a mechanism to support the informing of client nodes which have cached the HSS name for a given subscriber that the subscribers serving HSS address/node has changed. The approach that accommodates this limitation is to not cache the HSS name—thus imposing a greater processing load on the SLF and the network. Thus the use of SLF is not robust and imposes an extra load both on network and operational resources.

Figure 2:
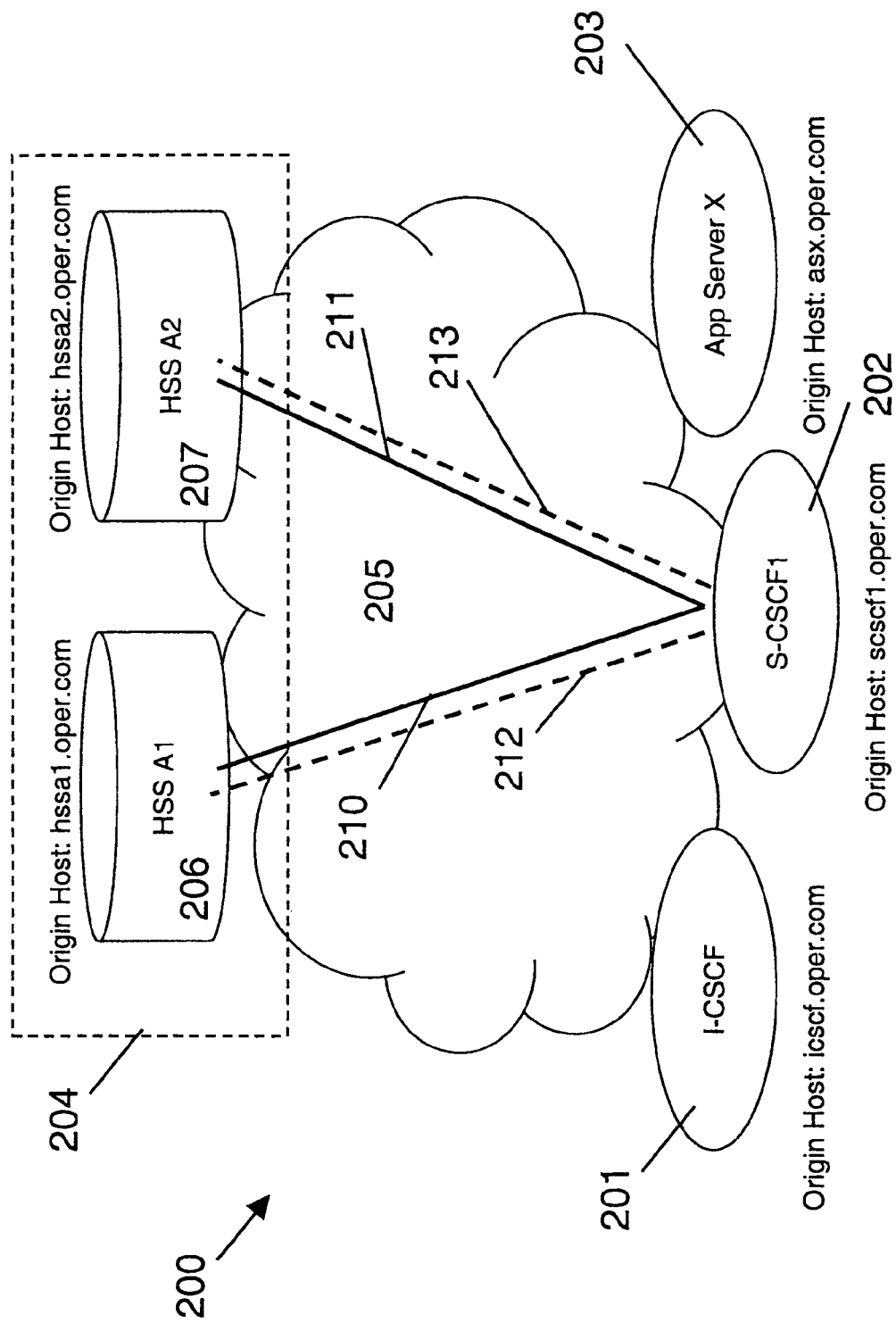
FIG. 2 shows a schematic diagram of an improved IMS network.

FIG. 2 shows a schematic diagram of an improved IMS network 200 according to a first example of the invention. The network comprises a number of nodes (not all of which are shown in FIG. 2): an I-CSCF 201, an S-CSCF 202, an AS 203 and an HSS 204, all connected by an IP network 205. The HSS 204 comprises two HSS nodes, HSS A1 206 and HSS A2 207, which can be considered as a cluster of HSS nodes. The cluster may contain two or more HSS nodes, but the following discussion will refer to two HSS nodes within the cluster by way of example only.

Preferably the two HSS nodes within the cluster are separated geographically, perhaps by as much as 1000 s of km, in order to reduce the vulnerability to events such as fire, flooding etc. The nodes in the cluster may be configured such that one node is the active HSS node and the other node is the standby HSS node, with both nodes containing data on all subscribers. Alternatively a configuration containing multiple active nodes is permissible.

As the number of subscribers to the network grows, the numbers of HSS nodes within the cluster can be increased and each node within the cluster may not necessarily contain information on all the subscribers. It is preferable that the information associated with a particular subscriber is stored on at least two geographically separated HSS nodes within the cluster, to reduce the likelihood of the information not being available if a HSS node within the cluster is out of action e.g. through failure or planned maintenance. As the number of nodes within the cluster can be increased, the solution is very scalable.

The network shown in FIG. 2 does not require a node with the functionality of an SLF to provide a centralised network based load-balancer router, but instead the HSS nodes within the cluster communicate with each other to ensure that requests received from client nodes within the network (e.g. from S-CSCF1 202) are sent to the correct HSS node within the cluster. This means that the single point of failure concern with the SLF is avoided.

Although the HSS cluster is shown operating without an SLF or other centralised network based load-balancer router, which is the preferred implementation, the invention could also be implemented in a network containing an SLF and could inter-operate with the SLF. One example may be where a network contains, in addition to the HSS cluster, a further HSS (which may or may not be of cluster type). The SLF can then operate with the two HSS entities in the same manner as described with reference to FIG. 1 and the SLF need not be aware of the intra HSS structure of the two HSS entities.

As shown in FIG. 2, the two HSS nodes within the cluster do not have a common address as viewed from the network, e.g. HSS A1 has the address hssa1.oper.com and HSS A2 has the address hssa2.oper.com. A client node in the network, e.g. S-CSCF1 may connect to one of the HSS nodes (e.g. to HSS A1 via link 210) or may maintain links to both the HSS nodes (e.g. to HSS A1 via link 210 and also to HSS A2 via link 211). Additional links 212, 213 are shown between S-CSCF1 and HSS A1 and A2 which may be present for added resilience. The client nodes do not need to be aware of the cluster nature of the HSS node 204, but each node 206, 207 within the HSS cluster is aware of the host names (e.g. hssa1.oper.com) of the other HSS nodes in the cluster and their current state (e.g. active/standby/failure/off line).

The links shown in FIG. 2 (210-213) and subsequent figures are indicated as lines. As will be apparent to a person skilled in the art, these may represent logical links rather than physical links and traffic may take any route between the end points through the IP network 205. Furthermore, where two links are shown between two node, in FIG. 2 and subsequent figures, this is by way of example only. There may alternatively be only one link between the two end nodes or more than two links.

Figure 3:
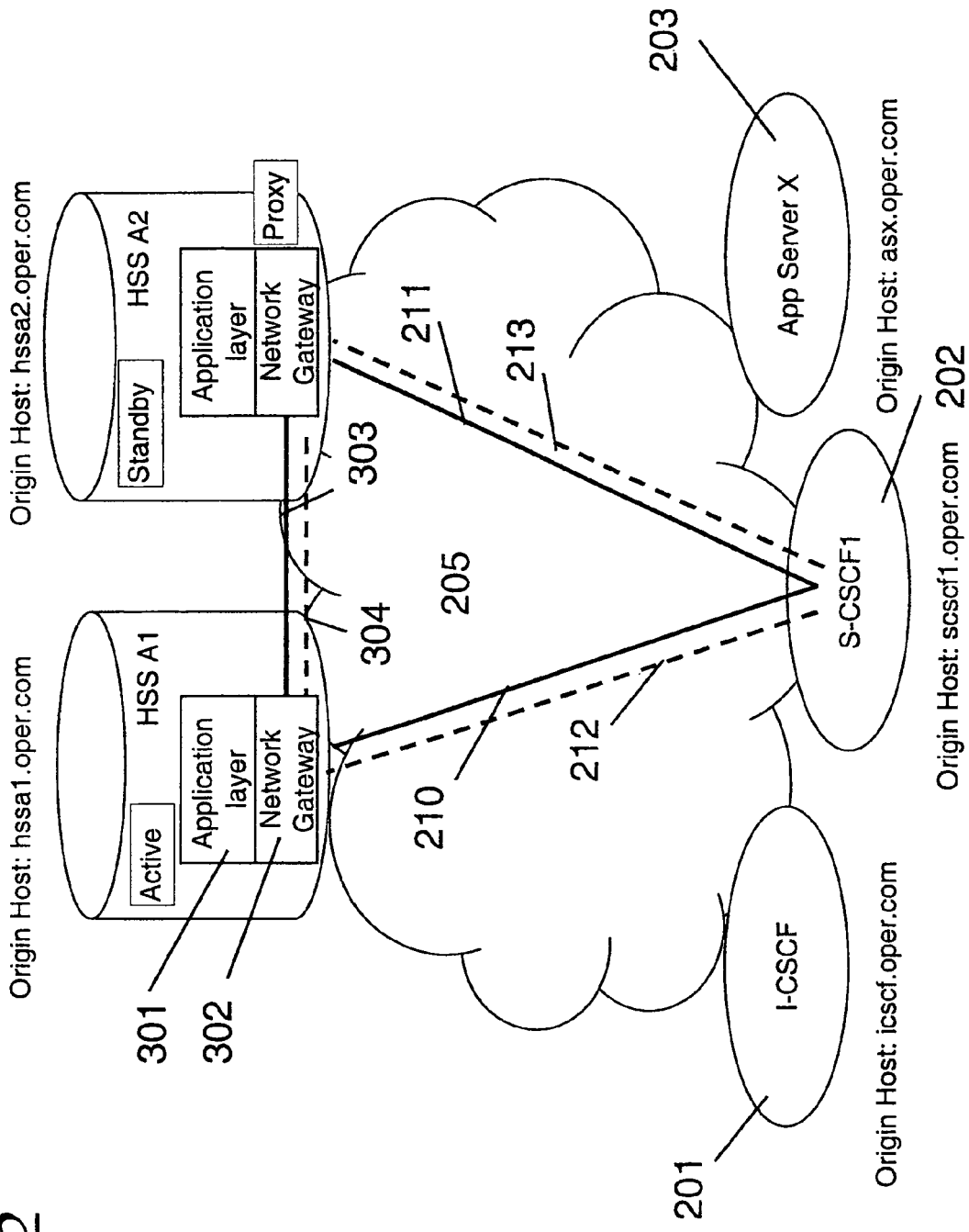
FIG. 3 shows a second schematic diagram of an improved IMS network.
Figure 4:
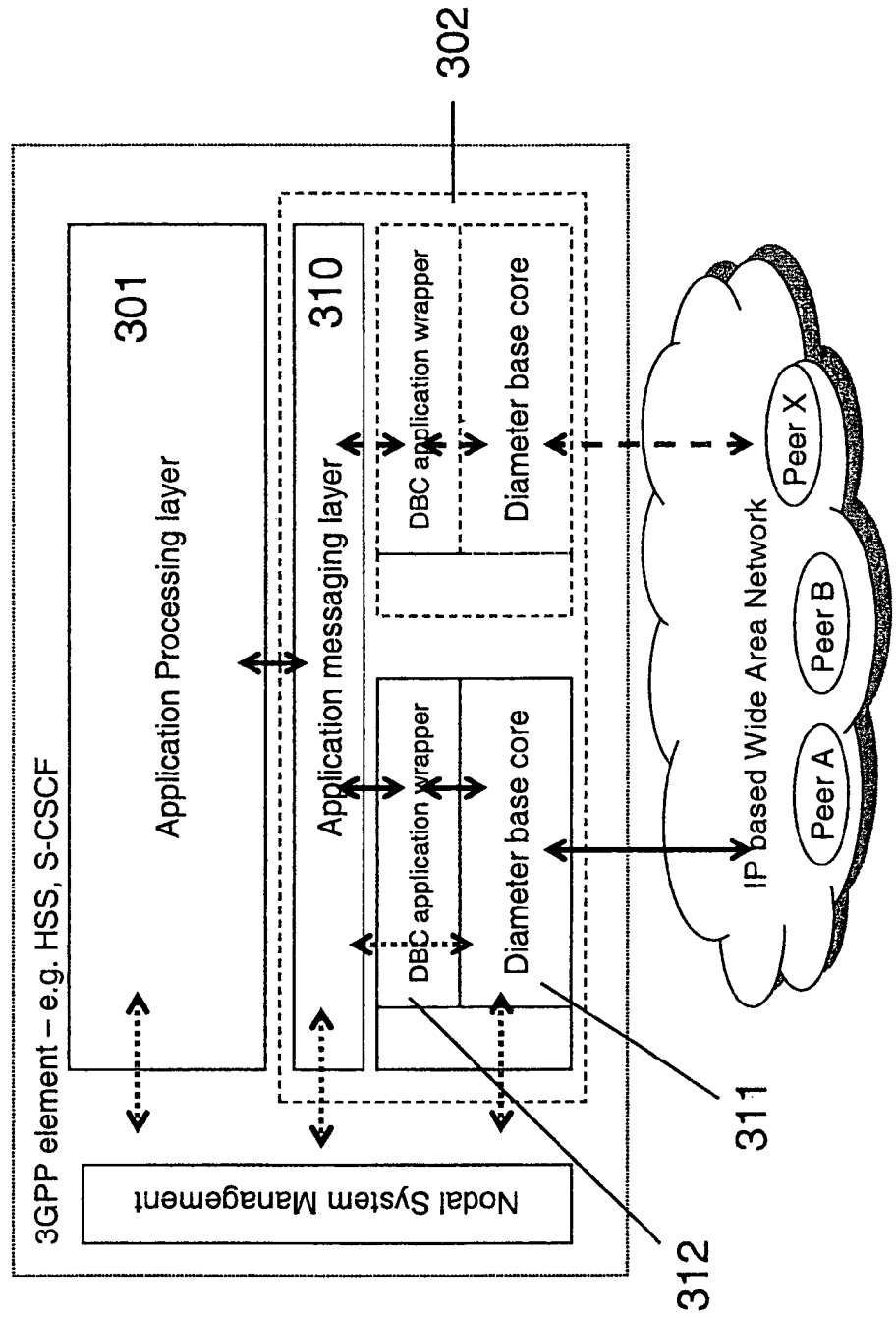
FIG. 4 shows a schematic diagram of an HSS node.

Further detail of the structure of each HSS node within the cluster is shown in FIGS. 3 and 4.

Each HSS node comprises an application layer 301 and a network gateway (or interface) 302. The application layer (or application processing layer) 301 provides the specific HSS processing functionality and is isolated from the network connection structure. The network gateway 302 communicates with client nodes (e.g. CSCF, AS nodes) and also with the network gateways of other HSS nodes within the cluster. This is shown in FIG. 3 where the network gateways communicate with S-CSCF1 via links 210-213 and the gateways communicate with each other via links 303, 304.

The connections between the HSS nodes within the HSS cluster could be provided by dedicated point to point links, for example by optical fibre or wired connection. However, use of the standard IP network and Diameter Cx/Sh peer connections is preferable because it does not require a specialised or optimised network infrastructure between the HSS nodes. This eases deployment and implementation since the internal resilience mechanism uses largely the same components as are required to support the IMS service.

Alternatively, or in addition to the Diameter Cx/Sh peer connections, a new Diameter application may be used to share information about the connection state of each HSS node between all the HSS nodes within the cluster.

Diameter is a protocol defined by 3GPP. The Diameter protocol is intended to provide a framework for any services which require AAA (Access, Authorization, and Accounting)/Policy support across many networks.

Cx and Sh are different 3GPP defined application protocols/interfaces that use a common Diameter base peer mechanism. Different nodes use different protocols e.g. CSCFs use Cx interfaces into the HSS whereas application servers use Sh interfaces to communicate with the HSS. The intra HSS connections hence can communicate both application protocols whereas from the network only one will be in use on a given connection.

Further detail of an example implementation of the network gateway 302 is shown in FIG. 4. The gateway comprises an Application Messaging Layer 310 which hides the network connection structure from the application processing 301. The application messaging layer routes messages across connections and may also implement some functions defined by Diameter base, for example, setting of end to end identifiers and organising retransmission on connection failure. The Diameter Base Core (DBC) 311 sets up connections to the network via a processing structure which maintains logical connections with peer nodes. This is achieved by implementing Diameter base protocol and creating and managing Diameter base connections. A DBC wrapper 312 interfaces the DBC into the higher layer, the application messaging layer 310, and therefore performs the required translations and interpretation. FIG. 4 shows two DBC instances, however two are not necessary and one DBC (with its associated DBC wrapper) may be sufficient. Providing more than one DBC instance gives benefits of increased resilience, serviceability (e.g. for software upgrade) and performance (through load-sharing).

In an example, as shown in FIG. 3, one HSS node is the active node (HSS A1) and the other HSS node is the standby node (HSS A2). As described above both HSS A1 and HSS A2 are aware of the host name of the other node in the cluster and also its active/standby state. The network gateway at the standby node, HSS A2, then acts as the Diameter proxy for the active node (this may be via standard Diameter proxy methods) and the client nodes need not know or alter their behaviour. For example, if S-CSCF1 sent a request to HSS A2 via link 211 using address hssa2.oper.com, the network gateway at HSS A2 would transfer the request to HSS A1 via link 303.

Figure 5:
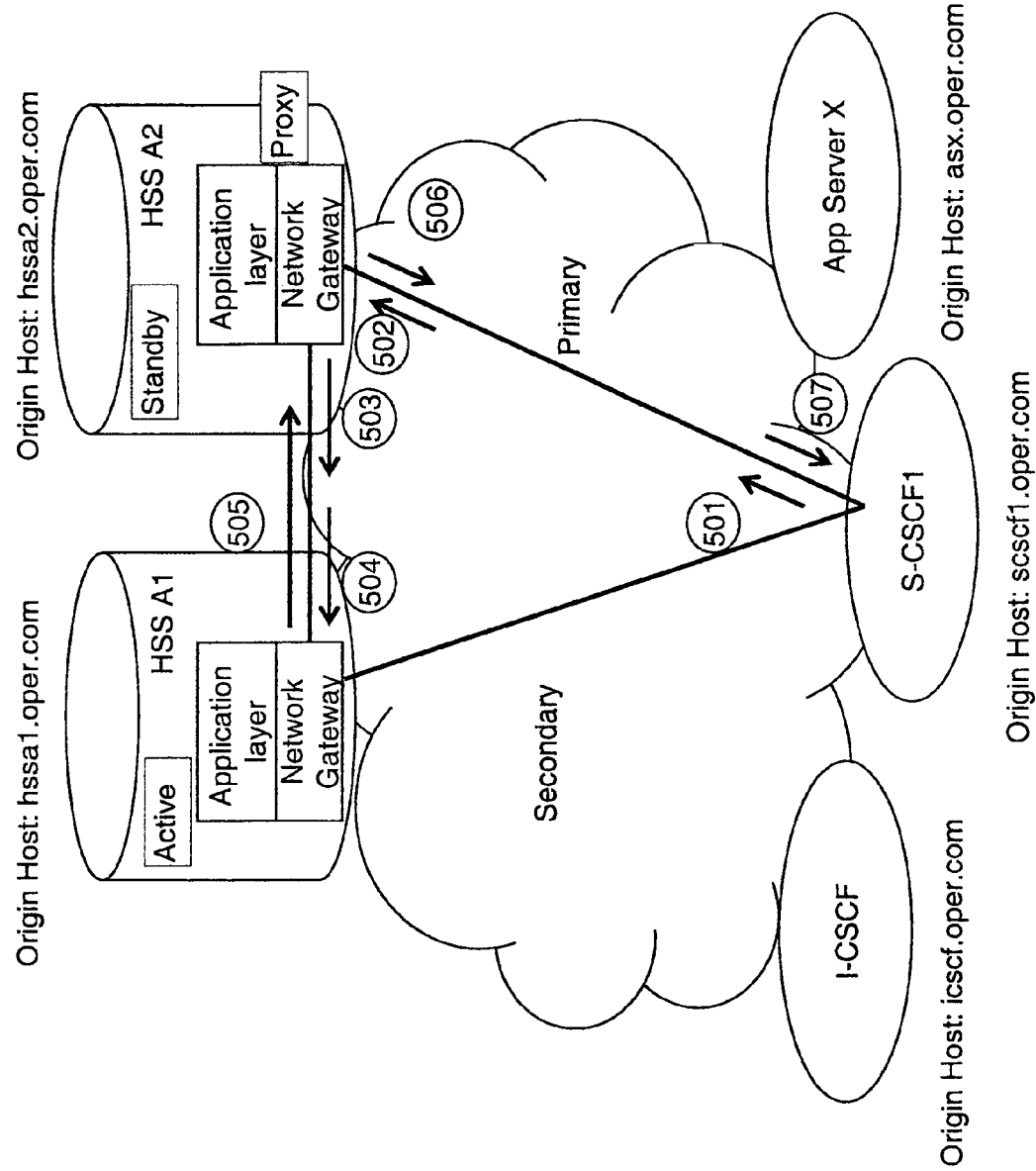
FIG. 5 shows a third schematic diagram of an improved IMS network.

An example of HSS connectivity is described below with reference to FIGS. 5 and 6. In this example, it is assumed that S-CSCF1 has selected hssa2.oper.com as the primary route to the HSS and that HSS A1 is the active node and HSS A2 is the standby node. Particular types of network messages are detailed here by way of example only.

Step 501: S-CSCF1 sends a SAR (3GPP Cx interface Server Assignment Request) to hssa2.oper.com.

Step 502: The SAR reaches HSS A2 network gateway setup as a proxy.

Step 503: The network gateway uses normal Diameter proxy action to send the SAR to HSS A1. This may involve adding Diameter proxy AVPs (Attribute Value Pairs)—for instance containing the original hop-hop identifier (H-H ID).

Step 504: The request reaches HSS A1 where it is processed.

Step 505: The network gateway at HSS A1 sends a SAA (3GPP Cx interface Server Assignment Answer) back to HSS A2 because it has been proxied. HSS A1 cannot send the SAA directly back to S-CSCF1 because the hop-hop identifiers will not match on that Diameter peer connection.

Step 506: HSS A2 restores the original hop-hop identifiers removes any proxy AVPs and sends the SAA back to S-CSCF1.

Step 507: The SAA is received as expected at S-CSCF1 i.e. it will tally with the pending request queue for the Diameter peer connection on which the request was sent.

Figure 7:
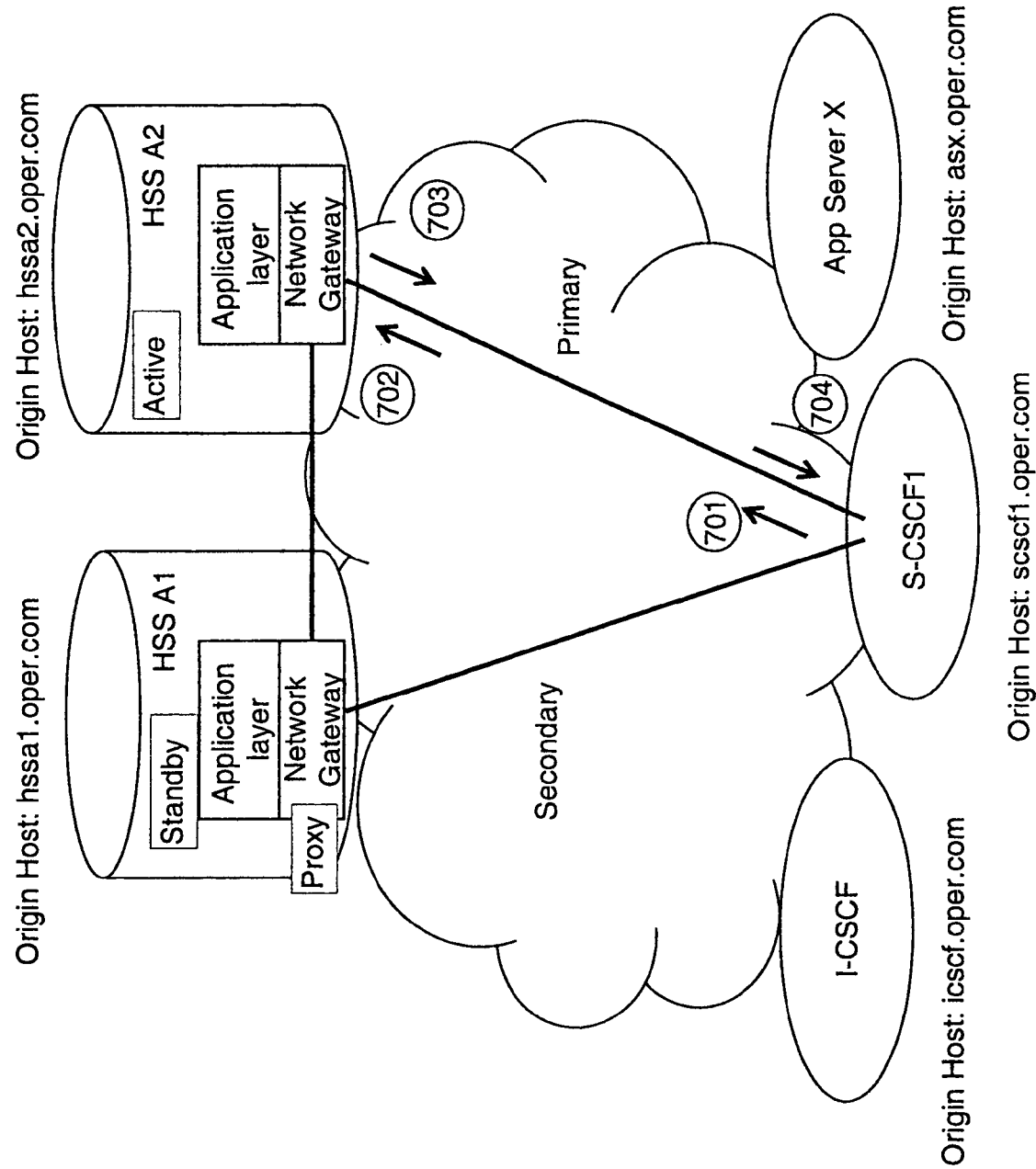
FIG. 7 shows a fourth schematic diagram of an improved IMS network.
Figure 8:
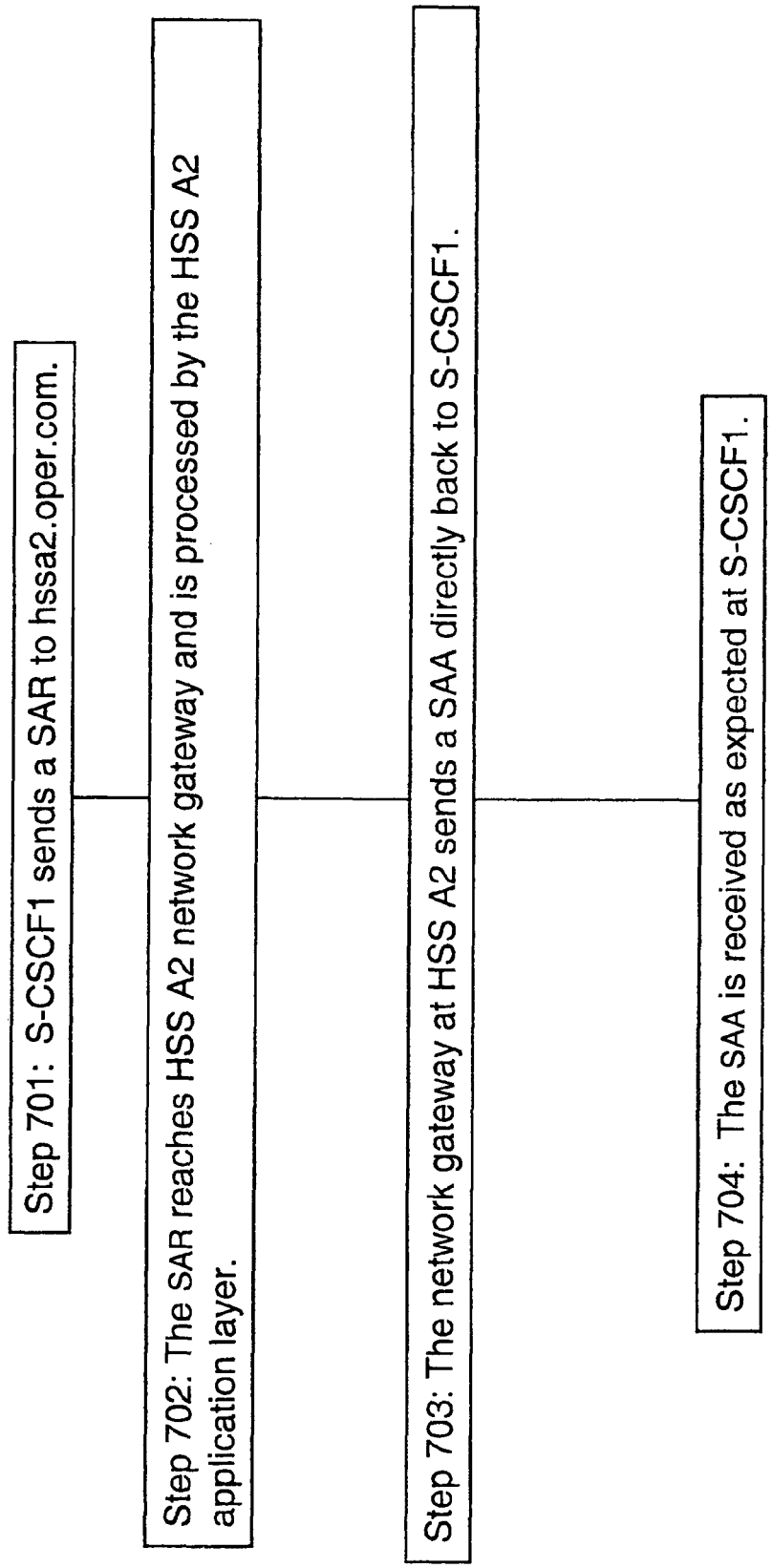
FIG. 8 shows a flow diagram of messages in the network of FIG. 7.

If subsequently, the active/standby states of the HSS nodes change within the cluster, this can be communicated between the HSS nodes in the cluster via the new Diameter application. This altered situation is shown in FIG. 7 and the revised process flow is shown in FIG. 8.

Step 701: S-CSCF1 sends a SAR to hssa2.oper.com.

Step 702: The SAR reaches HSS A2 network gateway and is processed by the HSS A2 application layer.

Step 703: The network gateway at HSS A2 sends a SAA directly back to S-CSCF1.

Step 704: The SAA is received as expected at S-CSCF1.

It can be seen by comparison of FIGS. 6 and 8 and the above description that although the active/standby states of the HSS nodes within the cluster has changed, the network clients (in this example S-CSCF1) have not needed to react or change either their actions or their network connectivity configuration (steps 501 and 701 are the same, and steps 507 and 704 are the same). This enables upgrade or maintenance of the HSS application layer to be totally transparent to the network.

As described above, a new Diameter application may be used between the network gateways associated with each HSS node in the cluster to communicate information on their state, e.g. standby/active. This application may also be used to share other information between the HSS nodes in the cluster, for example, information on whether connections are available from that HSS node to particular client nodes or whether such connections have been lost. Furthermore, routing information may be shared, such as instructions not to use this connection because it is about to be taken out of service in x seconds, and instead connections to node y should be used instead. Additionally, connection performance information may be shared between the HSS nodes within a cluster. Sharing of such information may allow optimisation of the operation of the HSS cluster, particularly where the numbers of HSS nodes within the cluster increases.

The sharing of information between nodes within the HSS cluster enables self-organisation and optimisation of connections within the cluster.

Figure 9:
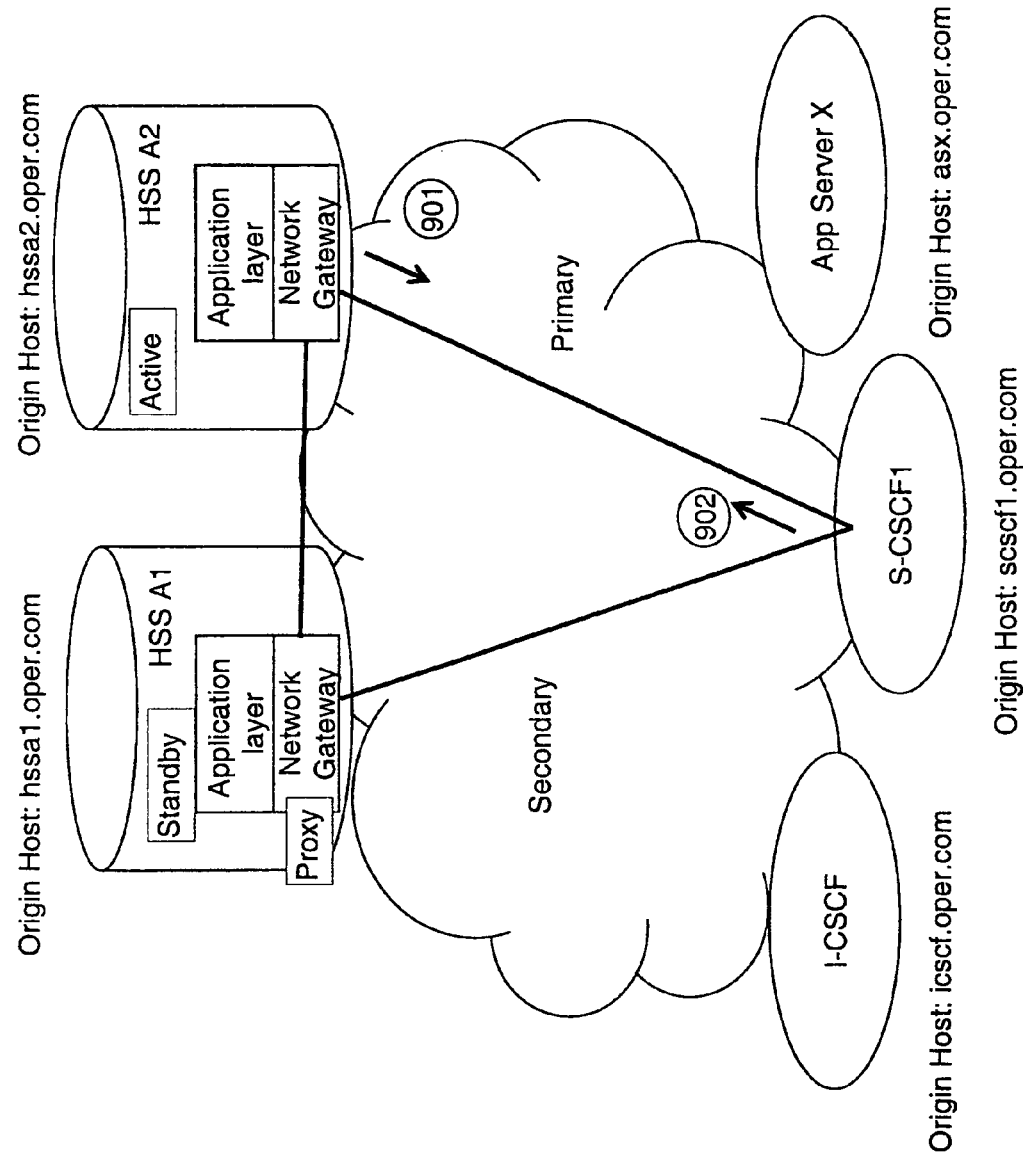
FIG. 9 shows a fifth schematic diagram of an improved IMS network.
Figure 10:
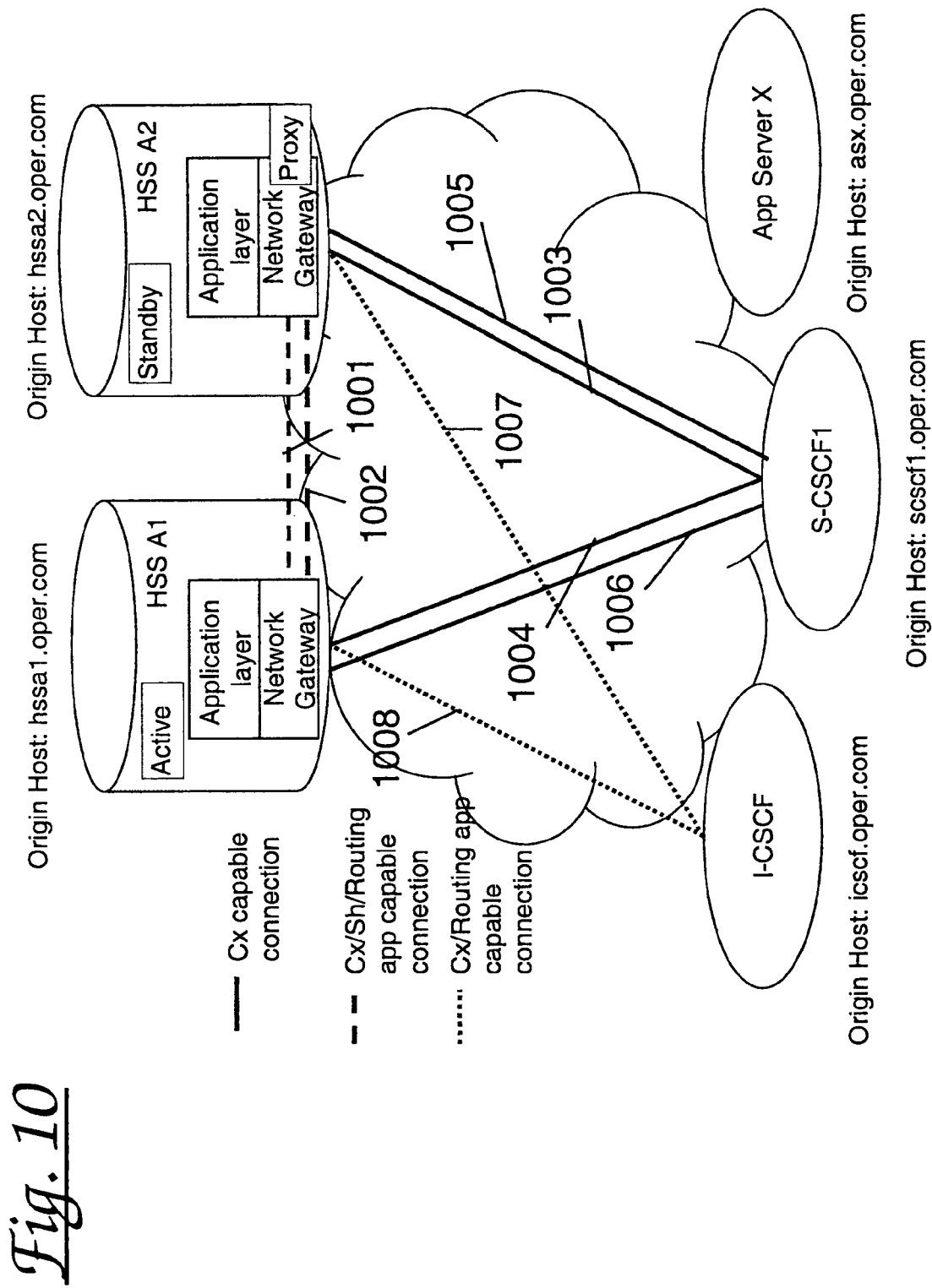
FIG. 10 shows a sixth schematic diagram of an improved IMS network.

In a further example of the invention, the use of the new Diameter application may be extended outside the HSS cluster itself to capable peer nodes, as shown in FIGS. 9 and 10. The information shared with peer/client nodes may be the same as the information shared within the HSS cluster, e.g. information on HSS node state, information on whether connections are available between an HSS node and a particular client node and routing information.

In FIG. 9, S-CSCF1 is shown as capable of receiving information via the new Diameter application. The client node S-CSCF1 may have registered/negotiated with the HSS cluster to indicate this capability. S-CSCF1 is shown having its primary connection to HSS A2 and its secondary connection to HSS A1. In this example, HSS A2 is to be taken completely out of service (including the network gateway). Information is therefore shared with S-CSCF1 (step 901) using the new Diameter application, that service by HSS A2 is about to be lost and S-CSCF1 should instead use HSS A1 as the alternative connection. The receipt of the information is acknowledged by S-CSCF1 (step 902).

In FIG. 10 three different types of connection are shown. The two HSS nodes A1 and A2 communicate over Cx/Sh/Routing capable connections 1001, 1002, where Routing is used as the reference for the new Diameter application described above. In the example of FIG. 10, S-CSCF1 is not capable of using the new Diameter application and therefore communicates with the HSS nodes via only Cx capable connections 1003-1006. The I-CSCF of FIG. 10, however is enabled for the new Diameter application and can therefore communicate with the HSS nodes via Cx/Routing capable connections 1007, 1008.

This extension of the new Diameter application outside the HSS cluster extends the benefits of self-organisation of connections and optimisation outside the cluster and more widely within the IMS network. It enables the network to self-organise the Cx/Sh application routing, for example a client node could determine whether their primary/secondary or load-sharing balance is correct. This may be achieved by the client nodes taking account of the Origin Host in Answer message from the HSS. Alternatively, a hop count AVP being could be used which reflected to the client node how many hops were required in a given transaction. The client node could then determine optimal routing based on this statistic.

An example of the benefits that can be achieved by the extension of the new Diameter application outside the HSS cluster can be explained with reference to FIG. 5. In FIG. 5, S-CSCF1 sends its requests to HSS A2, which is in a standby state, so that all the requests have to be proxied to HSS A1 for handling and then transferred back to HSS A2 before the answer can be provided to HSS A2. If S-CSCF1 was enabled with the new Diameter application, it could be informed that HSS A1 was the active node and HSS A2 was the standby node and then change the selection of primary and secondary links to the HSS nodes.

In addition, this extension of the new Diameter application outside the HSS cluster provides a basis for managing connectivity, e.g. in the case of nodal maintenance.

The discussion above relates to routing within the operators home network (intra-realm routing), as shown by the fact that all the nodes in FIG. 2 have addresses with the same ending: oper.com. This is because usually an HSS cluster would belong to a given administrative domain. However, the new Diameter application could also be used to inform nodes of routing changes/node states in an inter-realm situation since Diameter is designed to function in that environment— i.e. the infrastructure is there.

It will be understood that the above description of a preferred embodiment is given by way of example only and that various modifications may be made by those skilled in the art without departing from the spirit and scope of the invention.

The invention claimed is:

1. A first Home Subscriber Server (HSS) database node for connection to an Internet Protocol (IP) network, said first HSS database node having an interface comprising:
a port configured to receive a request for information from a network node connected to said IP network;
a processor configured to determine if said first HSS database node can respond to said request; and
a transmitter configured to forward the request to a second HSS database node if said first HSS database node cannot respond,
wherein said first HSS database node is a member of a plurality of remotely and separately located HSS database nodes that also include the second HSS database node, said first HSS database node being configured to communicate with other HSS database nodes of said plurality of HSS database nodes to ensure that requests for information from network nodes are sent to an appropriate one of said plurality of HSS database nodes, and wherein said first HSS database node further has an application layer configured to provide HSS functionality specific to said first HSS database node, and wherein said interface is isolated from said application layer and is configured to communicate with said other HSS database nodes via the IP network.

2. A first HSS database node according to claim 1, wherein:
said processor is configured to further obtain said information from said first HSS database node if said first HSS database node can respond to said request;
said port is configured to further receive said information from said second HSS database node if said first HSS database node cannot respond to said request; and
said transmitter is configured to further send said information to said network node.

3. A first HSS database node according to claim 1, wherein said request is a Server Assignment Request.

4. A first HSS database node according to claim 1, wherein said transmitter is configured to forward said request using a Diameter application.

5. A first HSS database node according to claim 1, wherein said transmitter is configured to further send status information to said second HSS database node.

6. A first HSS database node according to claim 1, wherein said transmitter is configured to further send routing information to said second HSS database node.

7. A first HSS database node according to claim 5, wherein said transmitter is configured to further share said status information with remote network nodes.

8. A first Home Subscriber Server (HSS) database node for connection to an Internet Protocol (IP) network comprising an interface and a database core, said interface comprising:
a port configured to receive a request for information from a network node connected to said IP network;
a processor configured to determine if said first HSS database node can respond to said request; and
a transmitter configured to forward the request to a second HSS database node if said first HSS database node cannot respond,
wherein said first HSS database node is a member of a plurality of remotely and separately located HSS database nodes that also include the second HSS database node, said first HSS database node being configured to communicate with other HSS database nodes of said plurality of HSS database nodes to ensure that requests for information from network nodes are sent to an appropriate one of said plurality of HSS database nodes, and wherein said first HSS database node further has an application layer configured to provide HSS functionality specific to said first HSS database node, and wherein said interface is isolated from said application layer and is configured to communicate with said other HSS database nodes via the IP network.

9. A distributed Home Subscriber Server (HSS) database for connection to an Internet Protocol (IP) network, said distributed HSS database comprising a plurality of distributed HSS database nodes, each one of said plurality of distributed HSS database nodes comprising an interface and a database core, an interface for a first one of said plurality of distributed HSS database nodes comprising:
a port configured to receive a request for information from a network node connected to said IP network;
a processor configured to determine if said first distributed HSS database node can respond to said request; and
a transmitter configured to forward the request to another one of said plurality of distributed HSS database nodes if said first distributed HSS database node cannot respond,
wherein said plurality of distributed HSS database nodes are members of a plurality of remotely and separately located HSS database nodes, each HSS database node being arranged to communicate with other HSS database nodes of said plurality of HSS database nodes to ensure that requests for information from network nodes are sent to an appropriate one of said plurality of HSS database nodes and wherein each of said plurality of HSS database nodes has an application layer for providing HSS functionality specific to that node.

10. A distributed database according to claim 9, wherein said plurality of distributed HSS database nodes are geographically dispersed.

11. A distributed database according to claim 9, wherein said IP network comprises a home realm of a single network operator.

12. A method of operating a first Home Subscriber Server (HSS) database node connected to an Internet Protocol (IP) network, comprising:
   receiving, by the first HSS database node, a request for information from a network node connected to the IP network;
   determining, by the first HSS database node, if said first HSS database node can respond to said request; and
   forwarding, by the first HSS database node, the request to a second HSS database node if said first HSS database node cannot respond,
   wherein said first and second HSS database nodes are members of a plurality of remotely and separately located HSS database nodes and each of said plurality of HSS database nodes has an application layer for providing HSS functionality specific to that node and a network gateway isolated from said application layer configured to communicate with said other HSS database nodes via the IP network,
   the method further comprising arranging the first HSS database node to communicate with other HSS database nodes of said plurality of HSS database nodes to ensure that requests for information from network nodes are sent to an appropriate one of said plurality of HSS database nodes.

13. A method of operating the first HSS database node according to claim 12, further comprising:
   if said first HSS database node can respond to said request, obtaining said information from said first HSS database node;
   if said first HSS database node cannot respond to said request, receiving said information from said second HSS database node; and
   sending said information to said network node.

14. A method of operating the first HSS database node according to claim 12, further comprising sending status information to said second HSS database node.

15. A method of operating the first HSS database node according to claim 12, further comprising sending routing information to said second HSS database node.

16. A method of operating the first HSS database node according to claim 12, further comprising receiving one of status and routing information from other HSS database nodes.

17. A method of operating the first HSS database node according to claim 14, further comprising sending status information to other nodes in the network.

18. A method of operating a first Home Subscriber Server (HSS) database node connected to an Internet Protocol (IP) network, said first HSS database node having an interface and a database core, comprising:
   receiving, by the first HSS database node, a request for information from a network node connected to the IP network;
   determining, by the first HSS database node, if said first HSS database node can respond to said request; and
   forwarding, by the first HSS database node, the request to a second HSS database node if said first HSS database node cannot respond,
   wherein said first and second HSS database nodes are members of a plurality of remotely and separately located HSS database nodes and each of said plurality of HSS database nodes has an application layer for providing HSS functionality specific to that node and a network gateway isolated from said application layer configured to communicate with said other HSS database nodes via the IP network,
   the method further comprising arranging the first HSS database node to communicate with other HSS database nodes of said plurality of HSS database nodes to ensure that requests for information from network nodes are sent to an appropriate one of said plurality of HSS database nodes.

19. A method of operating a distributed HSS database, said distributed HSS database comprising a plurality of HSS database nodes, comprising:
   receiving at a first one of said plurality of HSS database nodes, a request for information from a network node;
   determining at said first one of said plurality of HSS database nodes, if said first HSS database node can respond to said request; and
   if said first HSS database node cannot respond to said request, forwarding said request from said first HSS database node to a second one of said plurality of HSS database nodes,
   wherein said distributed HSS database comprises a plurality of remotely and separately located HSS database nodes and each HSS database node has an application layer for providing HSS functionality specific to that node and a network gateway isolated from said application layer configured to communicate with said other HSS database nodes via the IP network,
   the method further comprising arranging each HSS database node to communicate with other HSS database nodes of said plurality of HSS database nodes to ensure that requests for information from network nodes are sent to an appropriate one of said plurality of HSS database nodes.

20. A method of operating the HSS distributed database according to claim 19, further comprising:
   if said first HSS database node cannot respond to said request, receiving said information from said second one of said plurality of HSS database nodes; and
   sending said information to said network node in response to said request.

21. A method of operating the HSS distributed database according to claim 19, further comprising:
   sharing status information between each of said plurality of HSS database nodes; and
   at said first HSS database node, selecting said second one of said plurality of HSS database nodes on the basis of said status information.

22. A method of operating the HSS distributed database according to claim 21, further comprising:
   sharing routing information between each of said plurality of HSS database nodes; and
   at said first HSS database node, selecting said second one of said plurality of HSS database nodes on the basis of both said status and said routing information.

23. A first HSS database node according to claim 1, wherein said first HSS database node is arranged to store information for a number of subscribers such that information for a particular subscriber is stored on at least two of said plurality of HSS database nodes.

24. A first HSS database node according to claim 8, wherein said first of HSS database node is arranged to store information for a number of subscribers such that information for a particular subscriber is stored on at least two of said plurality of HSS database nodes.

25. A distributed HSS database according to claim 9, wherein each of said plurality of HSS database nodes is arranged to store information for a number of subscribers such that information for a particular subscriber is stored on at least two of said plurality of HSS database nodes.

26. A method according to claim 12, wherein said first HSS database node is arranged to store information for a number of subscribers such that information for a particular subscriber is stored on at least two of said plurality of HSS database nodes.

27. A method according to claim 18, wherein said first HSS database node is arranged to store information for a number of subscribers such that information for a particular subscriber is stored on at least two of said plurality of HSS database nodes.

28. A method according to claim 19, wherein each of said plurality of HSS database nodes is arranged to store information for a number of subscribers such that information for a particular subscriber is stored on at least two of said plurality of HSS database nodes.

29. A first HSS database node according to claim 1, configured to interact with the other HSS database nodes to avoid deployment of a service location function (SLF) in the IP network.

30. A first HSS database node according to claim 8, configured to interact with the other HSS database nodes to avoid deployment of a service location function (SLF) in the IP network.

31. A distributed HSS database according to claim 9, wherein the plurality of HSS database nodes are configured to interact to avoid deployment of a service location function (SLF) in the IP network.

32. A method according to claim 12, wherein arranging the first HSS database node to communicate with other HSS database nodes avoids deployment of a service location function (SLF) in the IP network.

33. A method according to claim 18, wherein arranging the first HSS database node to communicate with other HSS database nodes avoids deployment of a service location function (SLF) in the IP network.

34. A method according to claim 19, wherein arranging each database node to communicate with other HSS database nodes avoids deployment of a service location function (SLF) in the IP network.

\* \* \* \* \*